US012675160B2

(12) United States Patent
Nelson

(10) Patent No.: US 12,675,160 B2
(45) Date of Patent: Jul. 7, 2026

(54) EXTENDED REALITY INTERFACE

(71) Applicant: Neil Nelson, Providence, RI (US)

(72) Inventor: Neil Nelson, Providence, RI (US)

( * ) Notice: Subject to any disclaimer, the term of this patent is extended or adjusted under 35 U.S.C. 154(b) by 0 days.

(21) Appl. No.: 18/209,521

(22) Filed: Jun. 14, 2023

(65) Prior Publication Data

US 2023/0409113 A1 Dec. 21, 2023

Related U.S. Application Data

(60) Provisional application No. 63/352,692, filed on Jun. 16, 2022.

(51) Int. Cl.
*G06F 3/01* (2006.01)
*G06F 3/0346* (2013.01)

(52) U.S. Cl.
CPC ............ *G06F 3/014* (2013.01); *G06F 3/0346* (2013.01)

(58) Field of Classification Search
CPC ................................. G06F 3/014; G06F 3/346
See application file for complete search history.

(56) References Cited

U.S. PATENT DOCUMENTS

| | | | | |
|---|---|---|---|---|
| 4,517,424 A | * | 5/1985 | Kroczynski | H01H 13/807 |
| | | | | 235/145 R |
| 5,841,374 A | * | 11/1998 | Abraham | G06F 1/1666 |
| | | | | 341/23 |

| | | | | |
|---|---|---|---|---|
| 6,222,526 B1 | * | 4/2001 | Holmes | G06F 3/0338 |
| | | | | 345/161 |
| 6,288,709 B1 | * | 9/2001 | Willner | G06F 3/0219 |
| | | | | 348/E5.103 |
| 10,137,366 B1 | * | 11/2018 | Quesnel | A63F 13/98 |
| 10,599,233 B1 | * | 3/2020 | Amalou | G06F 3/0346 |
| 10,845,895 B1 | * | 11/2020 | Jentz | G06F 3/0304 |
| 11,054,982 B2 | * | 7/2021 | Chiu | G06F 3/011 |
| 11,185,763 B2 | * | 11/2021 | Bradner | A63F 13/573 |
| 11,857,869 B2 | * | 1/2024 | Rogoza | G06F 3/0338 |
| 11,992,751 B2 | * | 5/2024 | Nietfeld | G06F 3/0346 |
| 2008/0129687 A1 | * | 6/2008 | McAuliffe | G06F 3/0346 |
| | | | | 345/156 |
| 2008/0261693 A1 | * | 10/2008 | Zalewski | A63F 13/213 |
| | | | | 463/31 |
| 2018/0104576 A1 | * | 4/2018 | Hope | A63F 13/218 |
| 2018/0161670 A1 | * | 6/2018 | Boev | A63F 13/24 |
| 2019/0102927 A1 | * | 4/2019 | Yokokawa | G06F 3/017 |
| 2023/0191243 A1 | * | 6/2023 | Nokuo | G06F 3/0325 |
| | | | | 463/37 |
| 2023/0350490 A1 | * | 11/2023 | Knoppert | G06V 40/13 |
| 2023/0359267 A1 | * | 11/2023 | Everist | G06F 3/03547 |

* cited by examiner

*Primary Examiner* — Bipin Gyawali

(74) *Attorney, Agent, or Firm* — Bachman & LaPointe, P.C.

(57) ABSTRACT

An extended reality interface controller including a controller including a body formed by a frame; the frame having a first main body section and second main body section substantially bisecting the frame and a cap section spanning over the first main body section and second main body section; multidirectional switches operatively coupled to the frame; internal electronics housed within the frame; and a processor operatively coupled to the multidirectional switches.

17 Claims, 6 Drawing Sheets

EXTENDED REALITY INTERFACE

CROSS-REFERENCE TO RELATED APPLICATION

This application claims the benefit of provisional application Ser. No. 63/352,692 filed Jun. 16, 2022.

BACKGROUND

The present disclosure is directed to the improved extended reality interface and particularly to an extended reality interface hardware controller.

Extended reality (XR) is an emerging umbrella term for all the immersive technologies, such as augmented reality (AR), virtual reality (VR), and mixed reality (MR) plus those that are still to be created. Immersive technologies extend the reality experienced by people by either blending the virtual and "real" worlds or by creating a fully immersive experience.

In augmented reality, virtual information and objects are overlaid on the real world. This experience enhances the real world with digital details such as images, text, and animation. You can access the experience through AR glasses or via screens, tablets, and smartphones. Users are not isolated from the real world and can still interact and see what's going on in front of them.

In contrast to augmented reality, in a virtual reality experience, users are fully immersed in a simulated digital environment. Individuals must put on a VR headset or head-mounted display to get a 360-degree view of an artificial world that fools their brain into believing they are, e.g., walking on the moon, swimming under the ocean or stepped into whatever new world the VR developers created. The gaming and entertainment industry were early adopters of this technology; however, companies in several industries such as healthcare, construction, engineering, the military, and more are finding VR to be very useful.

In mixed reality, digital and real-world objects co-exist and can interact with one another in real-time. This is the latest immersive technology and is sometimes referred to as hybrid reality. It requires an MR headset and a lot more processing power than VR or AR. Microsoft's HoloLens is a great example that, e.g., allows you to place digital objects into the room you are standing in and give you the ability to spin it around or interact with the digital object in any way possible.

It is essential that the wearable devices that allow a full XR experience are fashionable and comfortable as well as always connected, intelligent, and immersive. There are significant technical and hardware issues to solve that include but are not limited to the display, power and thermal, motion tracking, connectivity and common illumination—where virtual objects in a real world are indistinguishable from real objects especially as lighting shifts.

What is needed is an ergonometric handheld controller that enables a full XR experience.

SUMMARY

In accordance with the present disclosure, there is provided an extended reality interface controller comprising a controller including a body 32 formed by a frame 34; the frame 34 having a first main body section 54 and second main body section 56 substantially bisecting the frame 34 and a cap section 58 spanning over the first main body section 54 and second main body section 56; multidirectional switches 38 operatively coupled to the frame; internal electronics 36 housed within the frame 34; and a processor 14 operatively coupled to the multidirectional switches 38.

A further embodiment of any of the foregoing embodiments may additionally and/or alternatively include the frame forms a thumb region opposite a base region.

A further embodiment of any of the foregoing embodiments may additionally and/or alternatively include the multidirectional switches are located in the thumb region and along the frame between the thumb region and the base region.

A further embodiment of any of the foregoing embodiments may additionally and/or alternatively include multidirectional switches comprise a thumb switch locate in the thumb region, an index finger switch, a middle finger switch, a ring finger switch and a pinkie finger switch each being configured aligned for each finger of a hand.

A further embodiment of any of the foregoing embodiments may additionally and/or alternatively include the extended reality interface controller further comprising strap coupled to the frame adjacent the thumb region and the base via a strap mounting slot 70.

A further embodiment of any of the foregoing embodiments may additionally and/or alternatively include the frame comprises at least one specialized form factor, including size, configuration, and physical arrangement that optimizes a fit into a hand and use of the controller by the user.

A further embodiment of any of the foregoing embodiments may additionally and/or alternatively include the extended reality interface controller further comprising an A button switch 50 and a B button switch 52 operatively coupled to the frame adjacent the thumb region.

In accordance with the present disclosure, there is provided an extended reality system comprising a controller operatively coupled to a processor; the controller including a body 32 formed by a frame 34; the frame 34 having a first main body section 54 and second main body section 56 substantially bisecting the frame 34 and a cap section 58 spanning over the first main body section 54 and second main body section 56; multidirectional switches 38 operatively coupled to the frame.

A further embodiment of any of the foregoing embodiments may additionally and/or alternatively include the extended reality system further comprising a tangible, non-transitory memory configured to communicate with the processor, the tangible, non-transitory memory having instructions stored therein that, in response to execution by the processor, cause the processor to perform operations comprising receiving, by the processor, data from the multidirectional switches; receiving, by the processor, the data with graphics and video imaging information.

A further embodiment of any of the foregoing embodiments may additionally and/or alternatively include the cap section is proximate a thumb region, the thumb region 60 including a sloped profile 62 configured for access to the switches.

A further embodiment of any of the foregoing embodiments may additionally and/or alternatively include the sloped profile 62 includes an angle α (Alpha) relative to a longitudinal axis L of the frame; the angle α places the orientation of the cap section 58 to allow for a thumb switch 48 as well as an A button switch 50 and a B button switch 52 to be manipulated by a thumb.

A further embodiment of any of the foregoing embodiments may additionally and/or alternatively include the extended reality system further comprising a base region 64 located on the frame 34 opposite the thumb region 60 along an axis L; the base region 64 being configured to support a strap 68 that extends from a first strap mounting slot 70 proximate the base region 64 to a second strap mounting slot 72 proximate the thumb region 60; wherein the base region 64 includes a strap release 74 that is configured to release and/or secure the strap 68 for adjustment.

A further embodiment of any of the foregoing embodiments may additionally and/or alternatively include the base region 64 includes a flair 78 configured for hand retention and an angle for the strap mounting slot 70; wherein the flair 78 being configured for different sized hands to grip the frame 34 along different locations so that a palm of the hand attains a comfortable grip.

A further embodiment of any of the foregoing embodiments may additionally and/or alternatively include the frame 38 is substantially tapered along a longitudinal axis L from a relatively larger sized thumb region 60 along the frame 34 to the base region 64; wherein the taper 80 is configured to match the shape of a palm of the hand and relative lengths of fingers to allow for an ergonomic feel placing the hand in a more neutral closed position.

A further embodiment of any of the foregoing embodiments may additionally and/or alternatively include the extended reality system further comprising a key plate 82 mounted interchangeable with the frame between the thumb region and the base region; the key plate having a variety of sizes to allow for the adjustment of the multidirectional switch locations and orientation on the frame 34; wherein the orientation of the multidirectional switches 38 is configured to be offset and/or staggered relative to an axis L to allow for the various finger lengths, so that a more neutral finger placement is achieved.

A further embodiment of any of the foregoing embodiments may additionally and/or alternatively include the extended reality system further comprising a thumb groove 84 located proximate the thumb region 60 and near the forefinger switch 40; the thumb groove 84 comprising a flat surface configured for a palm of a hand proximate a thumb to set into and grip to prevent relative rotation of the frame 34 in the palm of the hand.

A further embodiment of any of the foregoing embodiments may additionally and/or alternatively include the extended reality system further comprising a convex surface 86 that is configured to conform to a palm of a hand for ergonomic fit; and an oblong cross-section, formed in the frame configured for a natural shape of a hand near a palm and fingers at knuckles, such that a neutral grip can be attained.

A further embodiment of any of the foregoing embodiments may additionally and/or alternatively include the extended reality system further comprising an input/output connector 88 formed in the frame 34 configured for connectivity of the controller with power sources for charging or data transfer via a cable.

A further embodiment of any of the foregoing embodiments may additionally and/or alternatively include the extended reality system further comprising a motion tracking system 94 operatively coupled to the controller; wherein the motion tracking system 94 is at least one of internally mounted within the body 32 or externally mounted to the body 32.

A further embodiment of any of the foregoing embodiments may additionally and/or alternatively include the extended reality system of claim 8, wherein the multidirectional switches 38 are configured as analog joysticks; the multidirectional switches 38 can be configured to be aligned for each digit of a hand; the multidirectional switches 38 comprising an index finger switch 40, a middle finger switch 42, a ring finger switch 44, a pinkie switch 46 and a thumb switch 48.

Other details of the extended reality interface are set forth in the following detailed description and the accompanying drawings wherein like reference numerals depict like elements.

DETAILED DESCRIPTION

Figure 1:
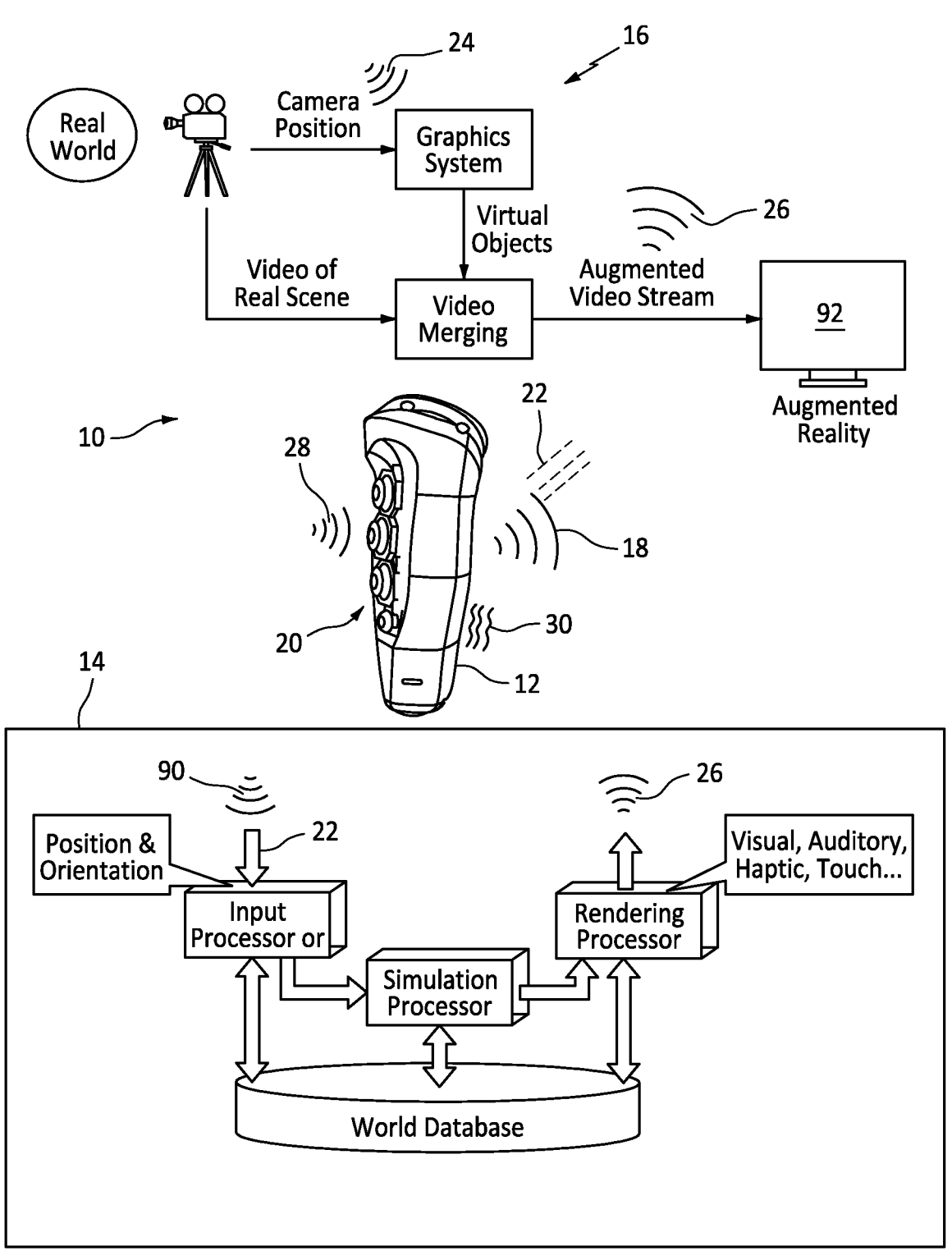
FIG. 1 is a schematic representation of an exemplary extended reality system.
Figure 2:
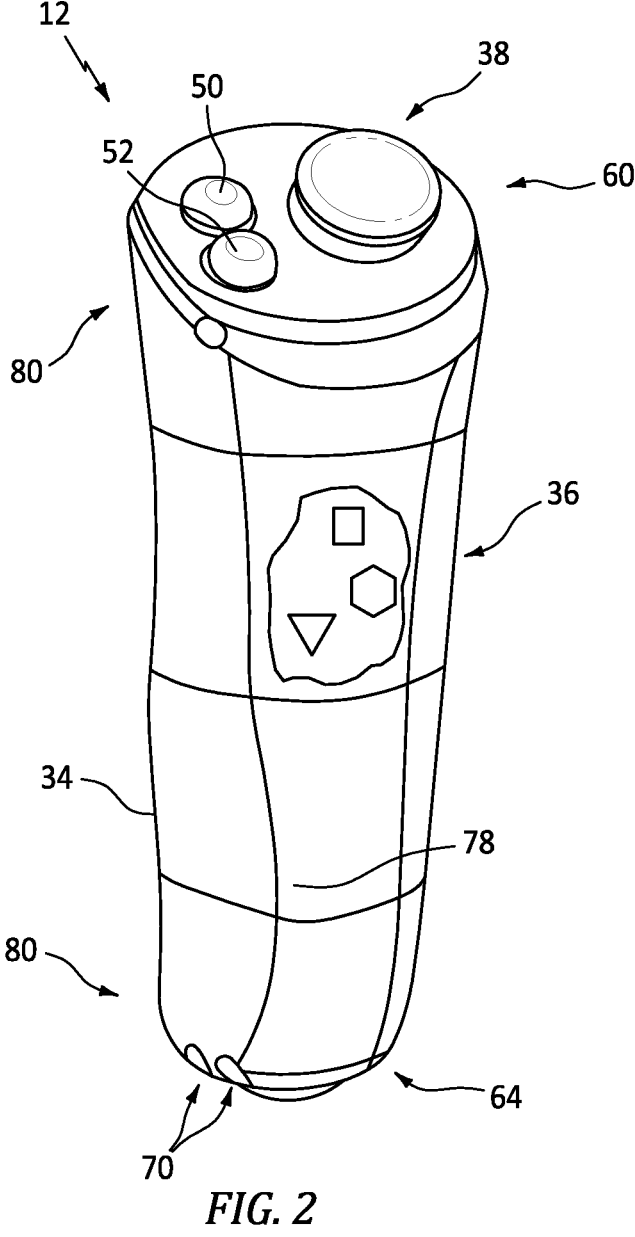
FIG. 2 is an isometric view schematic representation of an exemplary controller.

Referring now to FIG. 1, there is illustrated a schematic of an exemplary extended reality system 10. The extended reality system 10 can include an extended reality interface or simply a controller 12 operatively coupled to a processor or processors 14 as well as data gathering components 16. The controller 12 can be a handheld controller 12. The controller 12 can be operatively coupled to the processor 14 and data gathering components 16 via a wireless communication link 18.

The controller 12 is configured to allow a user (not shown) to manipulate the controller 12 with the hand to stimulate sensors 20 that create controller data 22 sent via controller output signals 24, such as commands, for the processor 14 and/or data gathering components 16 to initiate a variety of actions responsive to the output signals 24. The controller 12 can also receive processor data 26 communication input signals 28 from the processor 14 and/or the data gathering components 16. The processor data 26 can stimulate the controller 12 to provide the user feedback information 30, such as a vibration.

Also referring to FIGS. 2-6, the controller 12 is shown in multiple views. The controller 12 is a device that is configured for efficient interface within the extended reality system 10. The controller 12 can be configured as a single handheld controller or as a pair of handheld controllers 12. The controller 12 includes a frame 34 that houses internal electronics 36 and supports each of five keys or multidirectional switches 38. The internal electronics can include a chipset for processor 14, battery pack, motion tracking devices, vibration generator, wireless card and the like.

The multidirectional switches 38 can be configured as analog joysticks. The multidirectional switches 38 can be configured to be aligned for each digit of the hand (not shown). A fore finger or index finger switch 40, middle finger switch 42, ring finger switch 44, pinkie switch 46 and thumb switch 48 are shown in the figures.

The switches 38 can be configured as different styles of analog switches 38. For example, the thumb switch 48 can be a three-dimension analog joystick with a large size, the pinkie switch 46 can be a mini joystick design, such as a five-way momentary tactile switch, the forefinger switch 40, middle finger switch 42, and ring finger switch 44 can be multidirectional multi-stick style switches, such as a PSP-2-axis switch. It is contemplated that the switches can also be 4-D and even 5-D switches, with the capacity to include a press-down function and even time dependent, responsive to the timing of the push or even the resistance of the push from a finger. It is contemplated that the switches 38 can be tailored to meet the needs of the user's hands. In addition to the multidirectional switches 38, the controller 12 can include an A button switch 50 and a B button switch 52 that function to send out signals for system navigation and operational control of the processor 14. The A button switch 50 and B button switch 52 can also have the same configuration as the pinkie finger switch 46. The A button switch 50 and B button switch 52 can be a binary motion activation or multi-directional activation.

The frame 34 can be fabricated in multiple sections for ease of assembly. In an exemplary embodiment, the frame 34 can include a first main body section 54 and second main body section 56 substantially bisecting the frame 34 and a cap section 58 spanning over the first main body section 54 and second main body section 56. The frame 34 includes specialized form factors, including size, configuration, and physical arrangement that optimizes the fit into the hand and use of the controller 12 by the user. The form function of the frame 34 allows for a general symmetry along the vertical axis L (FIG. 5) allowing for an easy stowage and carry capability.

Figure 5:
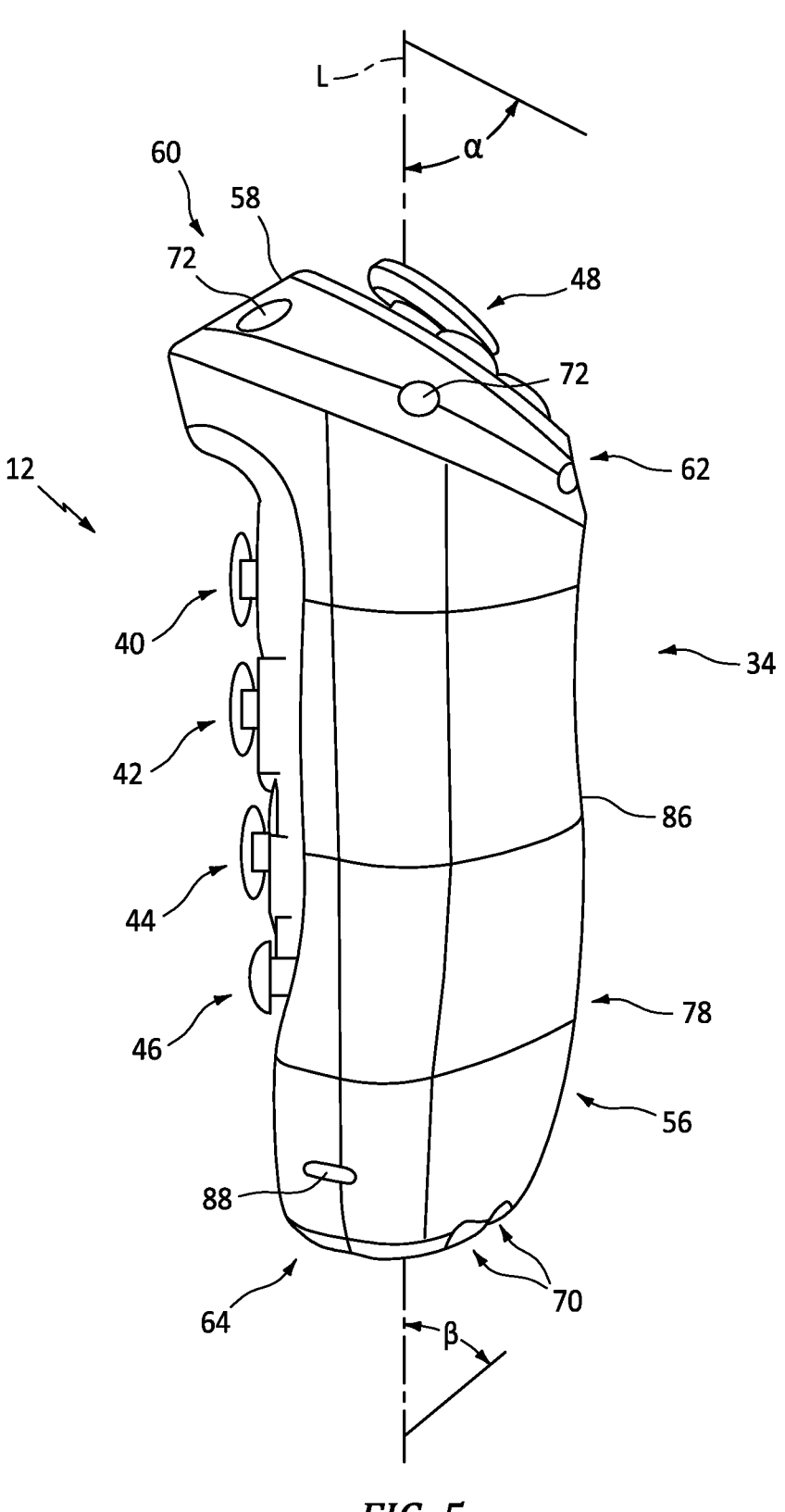
FIG. 5 is a left side view schematic representation of an exemplary controller

A thumb region 60 proximate the cap section 58 includes the thumb switch 48 and the A button switch 50 and B button switch 52. The thumb region 60 can include a sloped profile 62 that allows for proper access to the switches 48, 50, 52. The sloped profile 62 includes an angle α (Alpha) relative to the longitudinal axis L as seen in FIG. 5. The angle α places the orientation of the cap section 58 to allow for the thumb switch 48 as well as the A button switch 50 and B button switch 52 to be more easily manipulated by the thumb. The thumb switch 48 can be oriented substantially along the angle α for improved thumb access.

Figure 6:
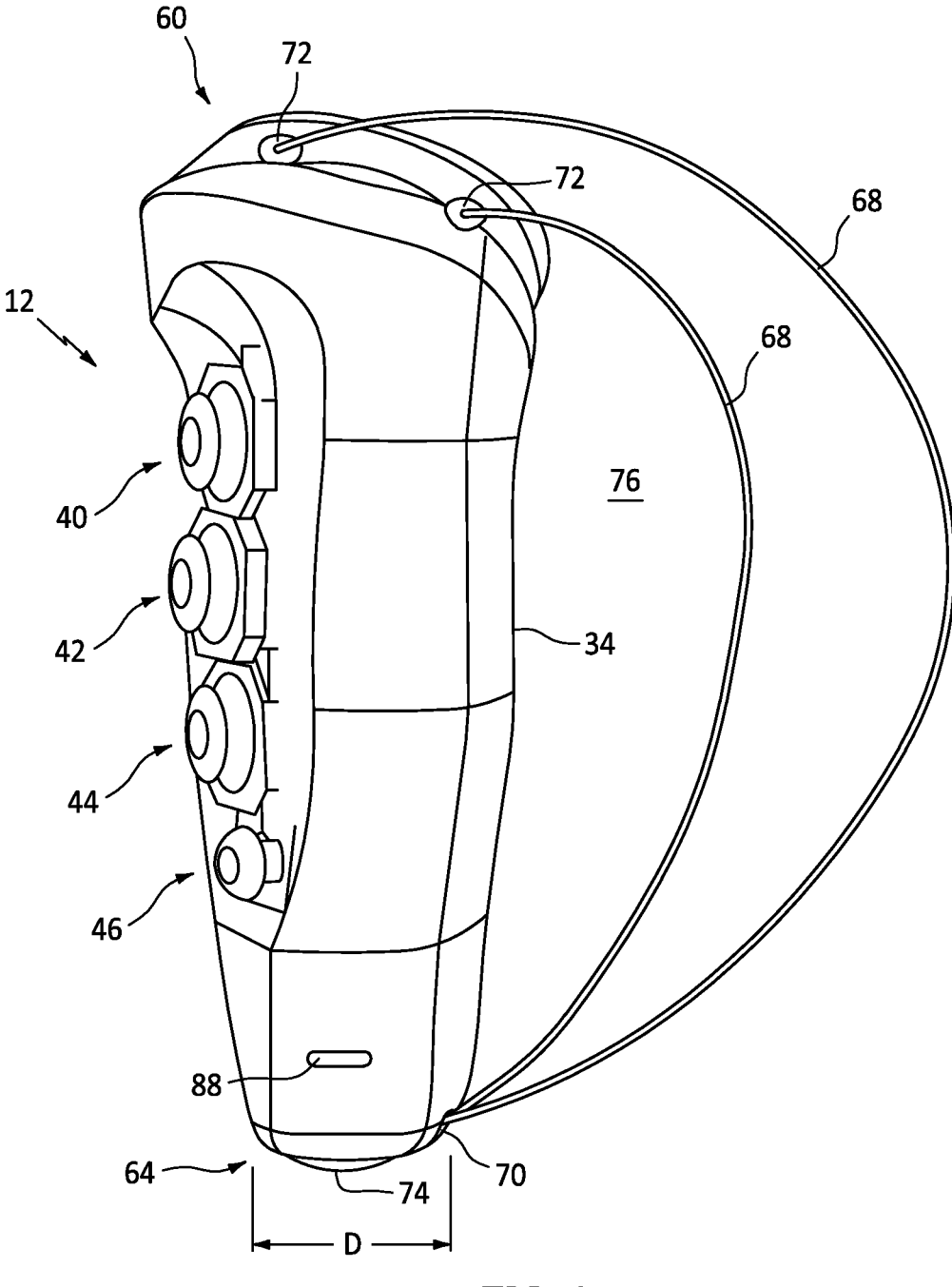
FIG. 6 is a front view schematic representation of an exemplary controller

A base region 64 is located on the frame 34 opposite the thumb region 60 along the axis L. The base region 64 is configured to support a strap 68 that extends from a first strap mounting slot 70 proximate the base region 64 to a second strap mounting slot 72 proximate the thumb region 60 as shown in FIG. 6. The base region 64 includes a strap release 74 that is configured to release and/or secure the strap 68 for adjustment. The strap mounting slots 70, 72 are also configured oriented along an angle β (Beta) to attach the strap 68 with an orientation that is curved to allow for a gap 76 between the strap 68 and frame 34 that conforms with the back of the hand (not shown). The strap 68 can be adjusted to snugly fit the back of the hand to secure the controller 12 in the hand(s). In an exemplary embodiment, the strap 68 can be a flexible fabric covered elastic flexible material that allows for flexure of the strap 68 and comfort.

The base region 64 includes a flair 78 that allows for hand retention as well as the angle for the strap mounting slot 70. The flair 78 allows for different sized hands to grip the frame 34 along different locations so that the palm of the hand attains a comfortable grip. The base region 64 also includes a smaller diameter D than the thumb region 60. The frame 38 is substantially tapered along the longitudinal axis L from a relatively larger sized thumb region 60 along the frame 34 to the base region 64. The taper 80 is configured to match the shape of the palm of the hand and the fingers relative lengths to allow for a comfortable ergonomic feel placing the hand in a more neutral closed position.

The orientation of the multidirectional switches 38 relative to the frame 38 can be adjusted to fit various hand sizes. A key plate 82 can be interchangeable and made in a variety of sizes to allow for the adjustment of the multidirectional switch 38 locations and orientation on the frame 34. The orientation of the multidirectional switches 38 can also be offset and/or staggered relative to the axis L to allow for the various finger lengths, so that the more neutral finger placement is achieved.

The frame 34 also includes a thumb groove 84 located proximate thumb region 60 and near the forefinger switch 40. The thumb groove 84 is a relatively flat surface that allows for the palm of the hand proximate the thumb to set into and grip to prevent the unnecessary relative rotation of the frame 34 in the palm of the hand. The thumb groove 84 allows the frame 34 to be anchored in the hand.

The frame 34 includes a convex surface 86 that is configured to conform to the palm of the hand for improved ergonomic fit. The frame 34 also has an oblong cross-section, not a perfect circular shape allowing for the natural shape of the hand near the palm and the fingers at the knuckles, such that a comfortable neutral grip is attained.

An input/output connector 88 is provided in the frame 34 allowing for connectivity of the controller 12 with power sources for charging or data transfer via cable.

Data 22, 26 may be transmitted to one or more processors 14 (e.g., computer systems having a central processing unit and memory) for recording, processing and storing the data received from the switches 38, data gathering components 16 and the like. Processor 14 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof. Processor 14 may be in communication (such as electrical communication) with switches 34, data gathering components 16 and the like and may be configured to receive input, such as key strokes and/or control information from controller 12. Processor 14 may receive data 22 transmitted by the controller 12 via a communication channel 90. Upon receiving the data 22, the processor 14 may process data 22 from controller 12 to perform operations.

In an exemplary embodiment, the processor 14 can be housed in the body 32. Since the body 32 contains substantially greater volume than a typical cell phone, ample space is provided for the processor 14 and auxiliary components that support the processor, such as cooling fans and the like. There is a technical advantage to housing the processor 14 in the body 32 eliminating the need for hard wire connections or a separate processor housing. The controller 12 with processor 14 within housing 32 can be coupled to a digital display 92, such as glasses.

Figure 3:
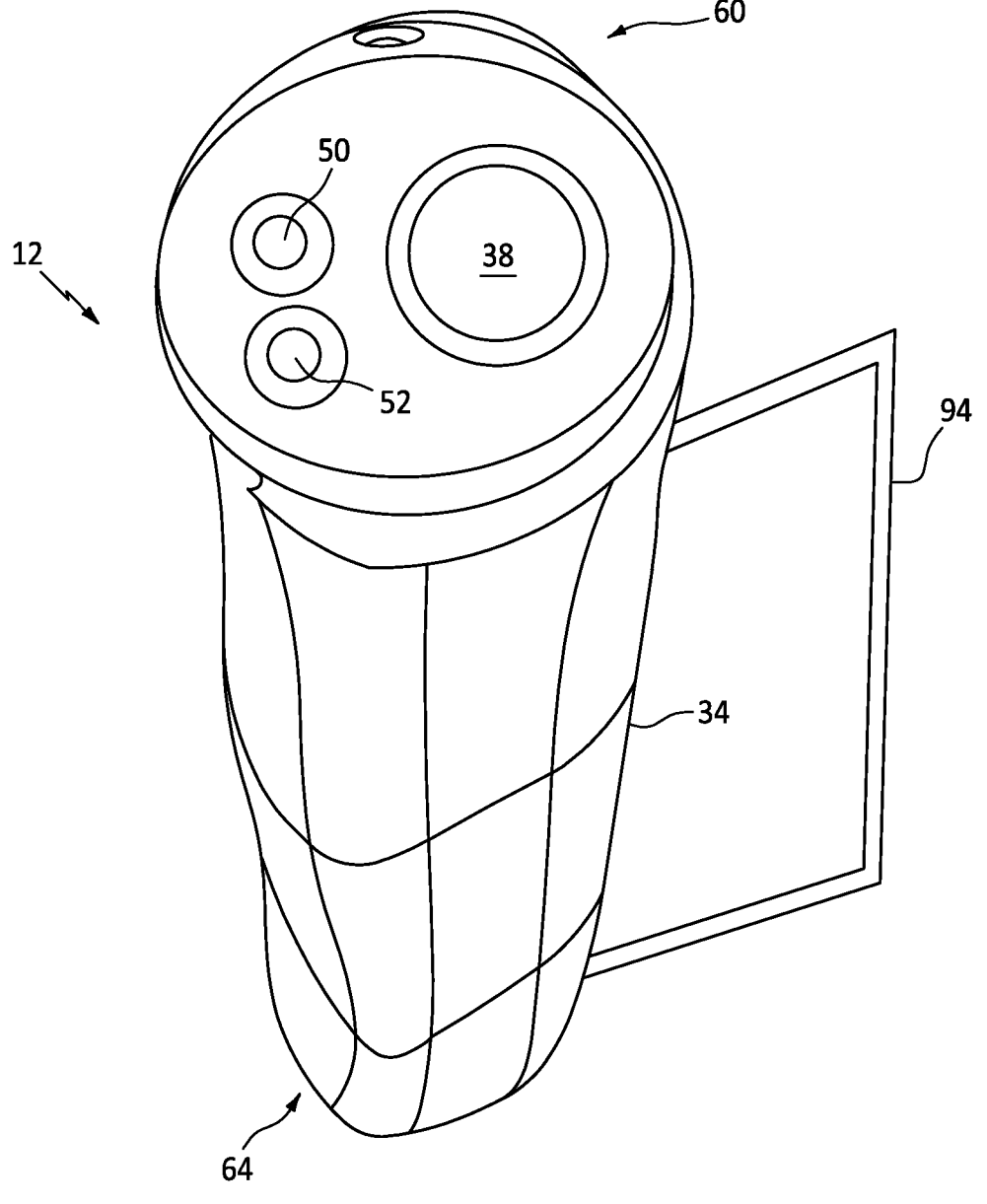
FIG. 3 is a top view schematic representation of an exemplary controller
Figure 4:
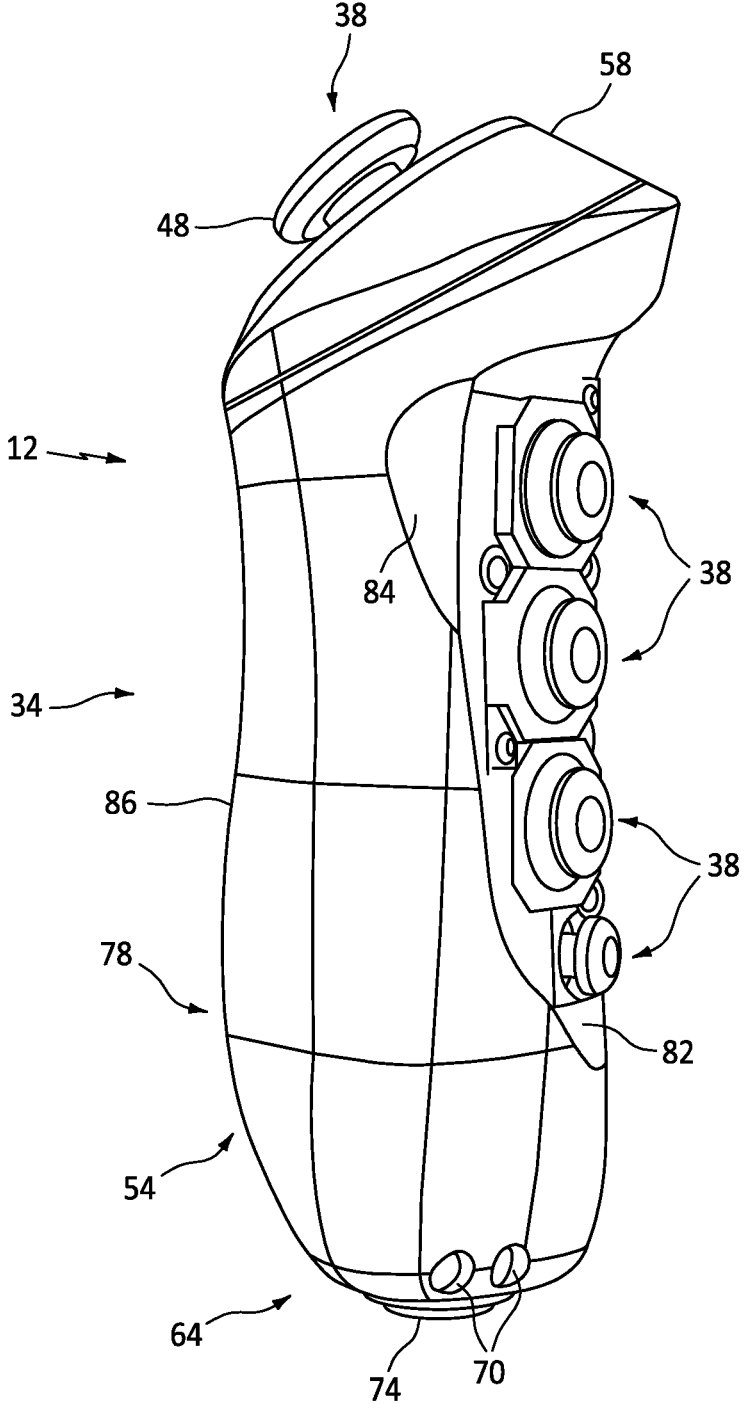
FIG. 4 is a right side view schematic representation of an exemplary controller

A modular attachable motion tracking system 94 can be operatively coupled to the controller 12, as shown in FIG. 3. The modular attachable motion tracking system 94 can be configured as a loop or ring that includes electronics. The tracking system 94 can be internally mounted within the body 32 or as shown, externally mounted.

A technical advantage of the extended reality system can include analog control capacity allowing for an interface for people to work efficiently and quickly using a hand control rather than a virtual control. Current solutions are largely technology that requires controls that are volumetric, being a projection in the digital display. Those controls are slower more awkward and less precise than the currently disclose system.

Another technical advantage includes tactile feedback, similar to a physical keyboard, the switch or key motion or depression allows for a positive indicator of input which aids in the efficiency of operator use without view of the device.

Another technical advantage of the extended reality system can include the capability for precise text and character input, for use in typing to create written works, such as word documents.

There has been provided an extended reality interface. While the extended reality interface has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An extended reality interface controller comprising:
a controller including a body formed by a frame;
the frame having a first main body section and second main body section substantially bisecting the frame and a cap section spanning over the first main body section and second main body section;
multidirectional switches operatively coupled to said frame wherein the multidirectional switches are configured as analog joysticks;
internal electronics housed within the frame; and
a processor housed in the body operatively coupled to the multidirectional switches; a non-transitory memory in operative communication with the processor and housed in the body; wherein the processor is in electrical communication with the multidirectional switches, and data gathering components, the processor is configured to receive input, such as key strokes and/or control information from the controller; the processor is configured to receive data transmitted by the controller via a communication channel, and configured to perform operations upon receiving the data to process data from the controller to perform operations; wherein the operations include processing a location from mounted hardware on the frame, generating graphics, and producing haptic feedback to a user; wherein said frame forms a thumb region opposite a base region; wherein the multidirectional switches comprise a thumb switch located in the thumb region, an index finger switch, a middle finger switch, a ring finger switch and a pinkie finger switch each being configured aligned for each finger of a hand.

2. The extended reality interface controller according to claim 1, wherein the multidirectional switches are located in the thumb region and along the frame between the thumb region and the base region.

3. The extended reality interface controller according to claim 1, further comprising strap coupled to the frame adjacent the thumb region and the base via a strap mounting slot.

4. The extended reality interface controller according to claim 1, wherein said frame comprises at least one specialized form factor, including size, configuration, and physical arrangement that optimizes a fit into a hand and use of the controller by the user.

5. The extended reality interface controller according to claim 1, further comprising an A button switch and a B button switch operatively coupled to said frame adjacent the thumb region.

6. An extended reality system comprising:
a controller operatively coupled to a processor; the controller including a body formed by a frame, the processor being housed in the body; a cooling fan housed in the body, the cooling fan in fluid communication with the processor; the frame having a first main body section and second main body section substantially bisecting the frame and a cap section spanning over the first main body section and second main body section; multidirectional switches operatively coupled to said frame; wherein the multidirectional switches are configured as analog joysticks; the multidirectional switches can be configured to be aligned for each digit of a hand; the multidirectional switches comprising an index finger switch, a middle finger switch, a ring finger switch, a pinkie switch and a thumb switch; a tangible, non-transitory memory configured to communicate with said processor, the tangible, non-transitory memory having instructions stored therein that, in response to execution by the processor, cause the processor to perform operations comprising:
receiving data transmitted by the controller via a communication channel;
receiving, by the processor, data from said multidirectional switches;
receiving, by the processor, the data with graphics and video imaging information;
performing, by the processor, operations upon receiving the data to process data from the controller;
processing, by the processor, a location from mounted hardware on the frame;
generating, by the processor, graphics, and
producing, by the processor, haptic feedback to a user.

7. The extended reality system of claim 6, further comprising:
a key plate mounted interchangeable with the frame between the thumb region and the base region; the key plate having a variety of sizes to allow for the adjustment of the multidirectional switch locations and orientation on the frame; wherein the orientation of the multidirectional switches is configured to be offset and/or staggered relative to an axis to allow for the various finger lengths, so that a more neutral finger placement is achieved.

8. The extended reality system of claim 6, further comprising:
a thumb groove located proximate the thumb region 60 and near the forefinger switch; the thumb groove comprising a flat surface configured for a palm of a hand proximate a thumb to set into and grip to prevent relative rotation of the frame in the palm of the hand.

9. The extended reality system of claim 6, further comprising:
a convex surface that is configured to conform to a palm of a hand for ergonomic fit; and
an oblong cross-section, formed in the frame configured for a natural shape of a hand near a palm and fingers at knuckles, such that a neutral grip can be attained.

10. The extended reality system of claim 6, further comprising:
an input/output connector formed in the frame configured for connectivity of the controller with power sources for charging or data transfer via a cable.

11. The extended reality system of claim 6, further comprising:
a motion tracking system operatively coupled to the controller; wherein the motion tracking system is at least one of internally mounted within the body or externally mounted to the body.

12. The extended reality system of claim 6, wherein the multidirectional switches are configured as different styles of analog switches; wherein the thumb switch is configured as a three-dimension analog joystick, the pinkie switch is configured as a mini joystick with a five-way momentary tactile switch, the forefinger switch, middle finger switch, and ring finger switch are configured as multidirectional multi-stick style switches.

13. The extended reality system according to claim 6, wherein said cap section is proximate a thumb region, the thumb region including a sloped profile configured for access to the switches.

14. The extended reality system according to claim 13, wherein the sloped profile includes an angle α (Alpha) relative to a longitudinal axis of the frame; the angle α places the orientation of the cap section to allow for a thumb switch as well as an A button switch and a B button switch to be manipulated by a thumb.

15. The extended reality system according to claim 6, further comprising:

a base region located on the frame opposite the thumb region along an axis; the base region being configured to support a strap that extends from a first strap mounting slot proximate the base region to a second strap mounting slot proximate the thumb region; wherein the base region includes a strap release that is configured to release and/or secure the strap for adjustment.

16. The extended reality system according to claim 15, wherein the base region includes a flair configured for hand retention and an angle for the strap mounting slot; wherein the flair being configured for different sized hands to grip the frame along different locations so that a palm of the hand attains a comfortable grip.

17. The extended reality system according to claim 15, wherein the frame is substantially tapered along a longitudinal axis from a relatively larger sized thumb region along the frame to the base region; wherein the taper is configured to match the shape of a palm of the hand and relative lengths of fingers to allow for an ergonomic feel placing the hand in a more neutral closed position.

\* \* \* \* \*